United States Patent
Nguyen et al.

(10) Patent No.: US 11,601,851 B2
(45) Date of Patent: Mar. 7, 2023

(54) EARLY RESOURCE RESERVATION

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Shailesh Patil, San Diego, CA (US); Arjun Bharadwaj, Cupertino, CA (US); Kapil Gulati, Hillsborough, NJ (US)

(73) Assignee: Qualcomm Incorporated, San Diego, CA (US)

( * ) Notice: Subject to any disclaimer, the term of this patent is extended or adjusted under 35 U.S.C. 154(b) by 233 days.

(21) Appl. No.: 15/930,144

(22) Filed: May 12, 2020

(65) Prior Publication Data

US 2020/0367111 A1     Nov. 19, 2020

Related U.S. Application Data

(60) Provisional application No. 62/847,178, filed on May 13, 2019.

(51) Int. Cl.
| | |
|---|---|
| *H04W 28/26* | (2009.01) |
| *H04W 72/10* | (2009.01) |
| *H04W 4/40* | (2018.01) |
| *H04W 72/04* | (2009.01) |
| *H04W 72/0446* | (2023.01) |

(52) U.S. Cl.
CPC ............. *H04W 28/26* (2013.01); *H04W 4/40* (2018.02); *H04W 72/0446* (2013.01); *H04W 72/10* (2013.01)

(58) Field of Classification Search
CPC ....... H04W 28/26; H04W 72/10; H04W 4/40; H04W 72/0446; H04W 74/0833; H04W 74/0816
See application file for complete search history.

(56) References Cited

U.S. PATENT DOCUMENTS

| | | | | |
|---|---|---|---|---|
| 8,238,235 B2 * | 8/2012 | Elaoud | ................... | H04L 47/70 370/230 |
| 2002/0159470 A1 * | 10/2002 | Atarashi | ............... | H04L 5/0019 370/441 |
| 2003/0012176 A1 * | 1/2003 | Kondylis | .............. | H04W 28/16 370/348 |

(Continued)

OTHER PUBLICATIONS

International Search Report and Written Opinion—PCT/US2020/032656—ISA/EPO—dated Aug. 10, 2020.

(Continued)

*Primary Examiner* — Tejis Daya
(74) *Attorney, Agent, or Firm* — Harrity & Harrity, LLP

(57) ABSTRACT

Various aspects of the present disclosure generally relate to wireless communication. In some aspects, a user equipment (UE) may determine whether sufficient resources are available to perform a transmission in a current slot. The UE may transmit the transmission in the current slot, transmit an early reservation signal for a future resource, or determine whether sufficient resources are available to perform the transmission in a subsequent slot based at least in part on a probability-based determination and based at least in part on whether sufficient resources are available to perform the transmission in the current slot. Numerous other aspects are provided.

30 Claims, 7 Drawing Sheets

(56) References Cited

U.S. PATENT DOCUMENTS

| | | | | |
|---|---|---|---|---|
| 2005/0141464 | A1* | 6/2005 | Willey | H04W 68/00 |
| | | | | 370/337 |
| 2006/0112168 | A1* | 5/2006 | Albers | H04L 65/80 |
| | | | | 709/213 |
| 2007/0058660 | A1* | 3/2007 | Sammour | H04W 74/0866 |
| | | | | 370/445 |
| 2008/0181250 | A1* | 7/2008 | Koski | H04W 74/0808 |
| | | | | 370/445 |
| 2018/0309513 | A1* | 10/2018 | Kim | H04W 72/0446 |
| 2020/0037199 | A1* | 1/2020 | Wang | H04W 72/1242 |
| 2020/0351826 | A1* | 11/2020 | Bharadwaj | H04W 28/26 |

OTHER PUBLICATIONS

Peyravi H., "Medium Access Control Protocols Performance in Satellite Communications", IEEE Communication Magazine, IEEE Service Center, Piscataway, vol. 37, No. 3, Mar. 1, 1999 (Mar. 1, 1999), pp. 62-71. XP000823973, 62 pages, ISSN: 0163-6804, DOI: 10.1109/35.751497, The Whole document.

Wong E.W.M., et al., "In Search of the Minimum Delay Protocol for Packet Satellite Communications", IEICE Transactions on Communications, Communications Society, Tokyo, JP, vol. E76-B. No. 5. May 1, 1993 (May 1, 1993), pp. 508-517, XP000381139, ISSN: 0916-8516 p. 509.

* cited by examiner

EARLY RESOURCE RESERVATION

CROSS-REFERENCE TO RELATED APPLICATION

This Patent Application claims priority to U.S. Provisional Patent Application No. 62/847,178, filed on May 13, 2019, entitled "EARLY RESOURCE RESERVATION FOR NEW RADIO," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for early resource reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether sufficient resources are available to perform a transmission in a current slot; and transmitting the transmission in the current slot, transmitting an early reservation signal for a future resource, or determining whether sufficient resources are available to perform the transmission in a subsequent slot based at least in part on a probability-based determination and based at least in part on whether sufficient resources are available to perform the transmission in the current slot.

In some aspects, a UE for wireless communication may include memory and one or more processors operatively coupled to the memory. The memory and the one or more processors may be configured to determine whether sufficient resources are available to perform a transmission in a current slot; and transmit the transmission in the current slot, transmit an early reservation signal for a future resource, or determine whether sufficient resources are available to perform the transmission in a subsequent slot based at least in part on a probability-based determination and based at least in part on whether sufficient resources are available to perform the transmission in the current slot.

In some aspects, a non-transitory computer-readable medium may store one or more instructions for wireless communication. The one or more instructions, when executed by one or more processors of a UE, may cause the one or more processors to: determine whether sufficient resources are available to perform a transmission in a current slot; and transmit the transmission in the current slot, transmit an early reservation signal for a future resource, or determine whether sufficient resources are available to perform the transmission in a subsequent slot based at least in part on a probability-based determination and based at least in part on whether sufficient resources are available to perform the transmission in the current slot.

In some aspects, an apparatus for wireless communication may include means for determining whether sufficient resources are available to perform a transmission in a current slot; and means for transmitting the transmission in the current slot, transmitting an early reservation signal for a future resource, or determining whether sufficient resources are available to perform the transmission in a subsequent slot based at least in part on a probability-based determination and based at least in part on whether sufficient resources are available to perform the transmission in the current slot.

Aspects generally include a method, apparatus, system, computer program product, non-transitory computer-readable medium, user equipment, base station, wireless communication device, and processing system as substantially described with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
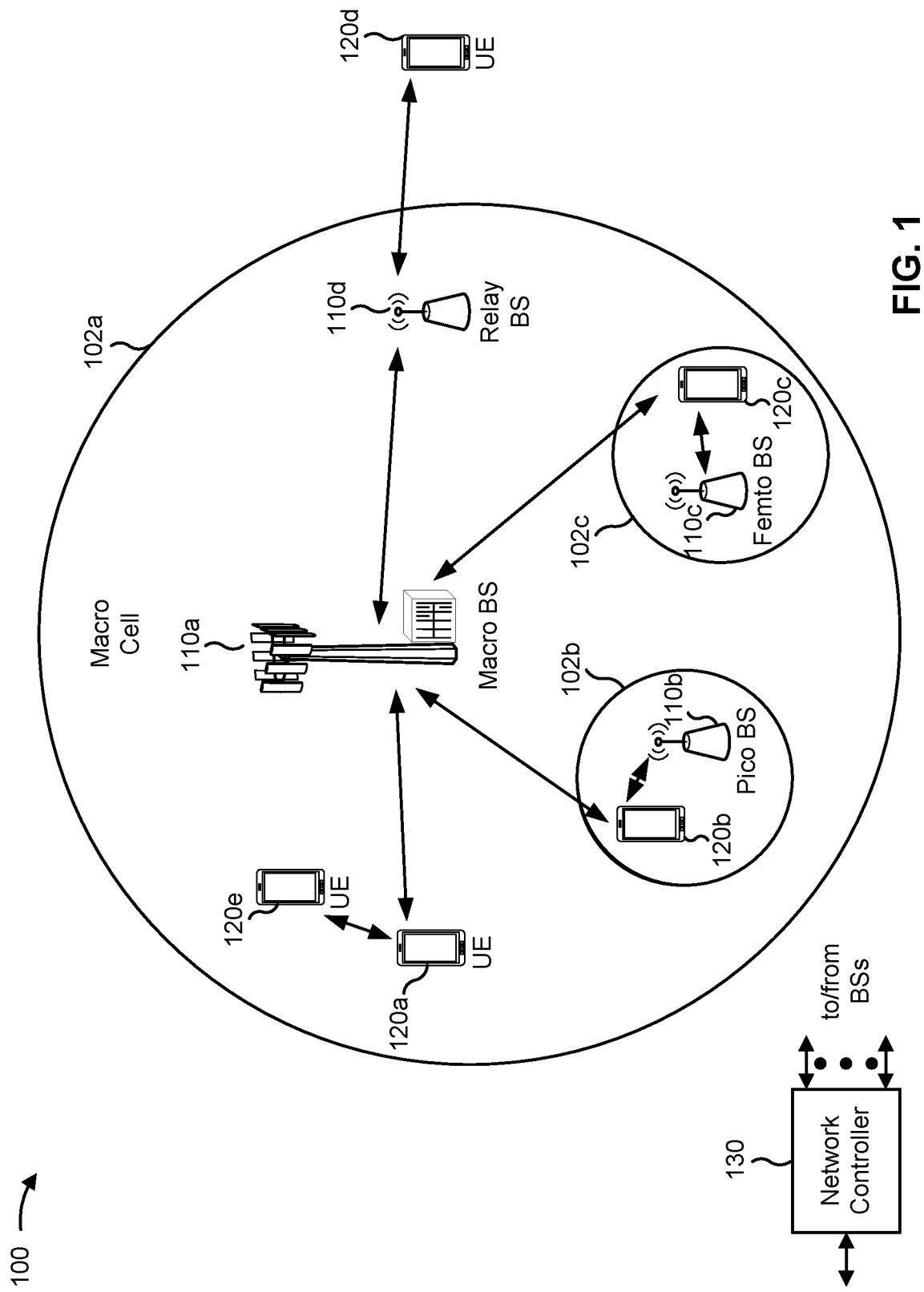
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
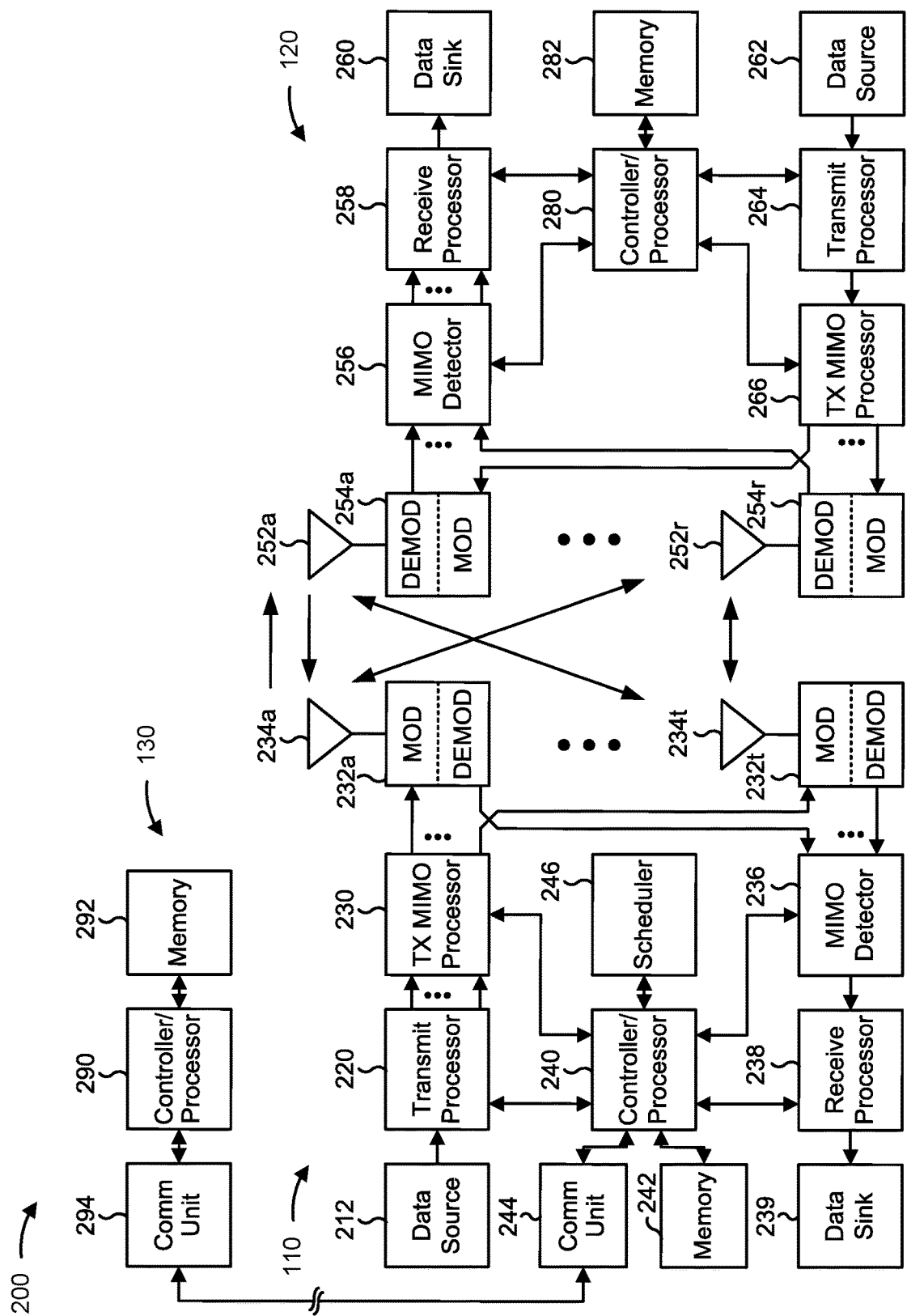
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with early resource reservation for NR, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining whether sufficient resources are available to perform a transmission in a current slot; means for transmitting the transmission in the current slot, transmitting a reservation signal for a future resource, or determining whether sufficient resources are available to perform the transmission in a subsequent slot based at least in part on a probability-based determination and based at least in part on whether sufficient resources are available to perform the transmission in the current slot; means for transmitting the transmission in the current slot with a first probability; means for transmitting the early reservation signal for the future resource with a second probability; means for deferring the transmission to the subsequent slot with a third probability; means for waiting until the subsequent slot, and determining whether sufficient resources are available to perform the transmission in the subsequent slot with a third probability; means for transmitting the early reservation signal for the future resource with a fourth probability; means for determining whether sufficient resources are available to perform the transmission in the subsequent slot with a fifth probability; means for determining whether sufficient resources are available to perform the transmission in the current slot and whether sufficient resources are available to transmit the early reservation for the future resource in the current slot; and/or the like. In some aspects, such means may include one or more components of UE 120 described in connection with FIG. 2.

As indicated above, FIG. 2 is provided as an example. Other examples may differ from what is described with regard to FIG. 2.

Figure 3:
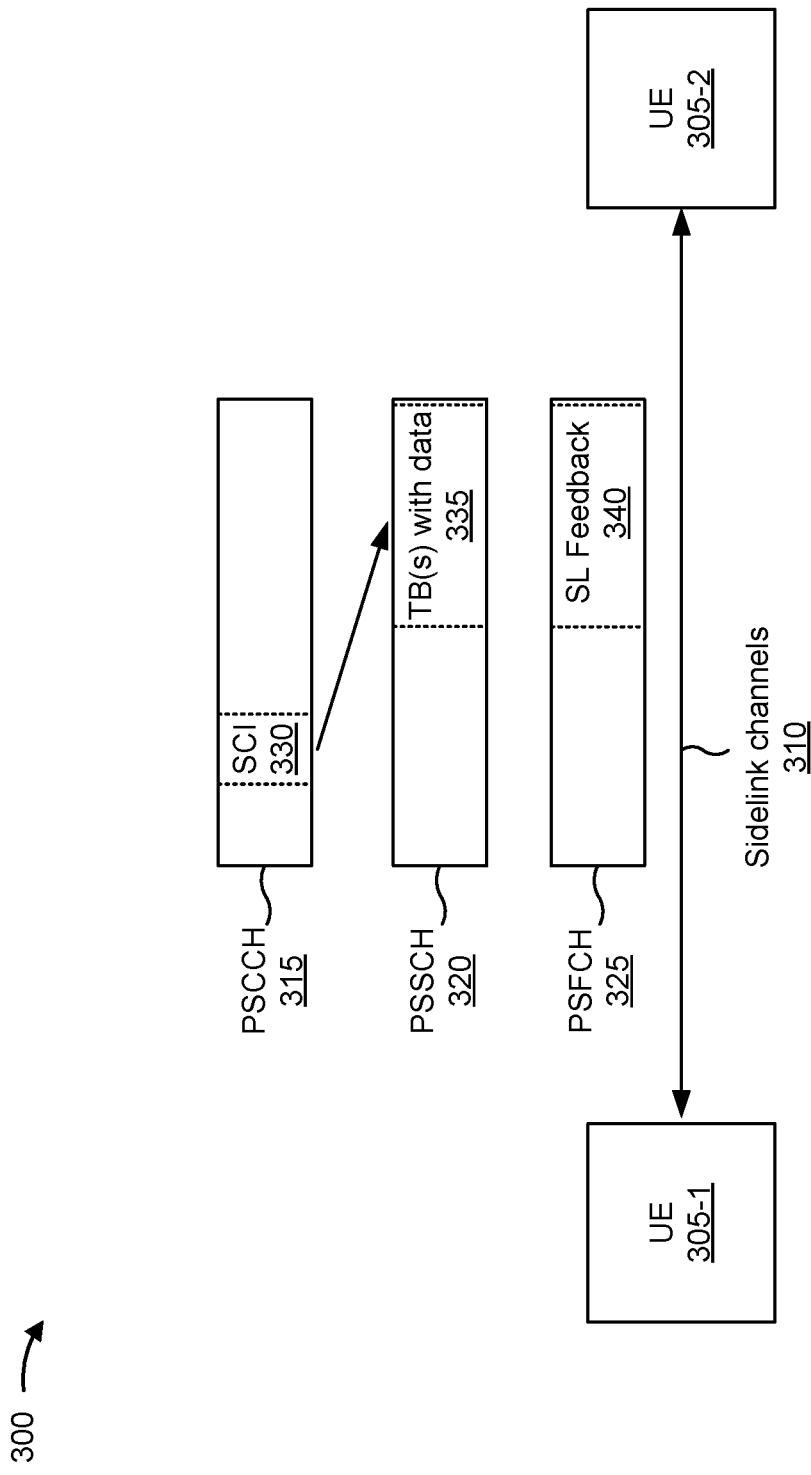
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
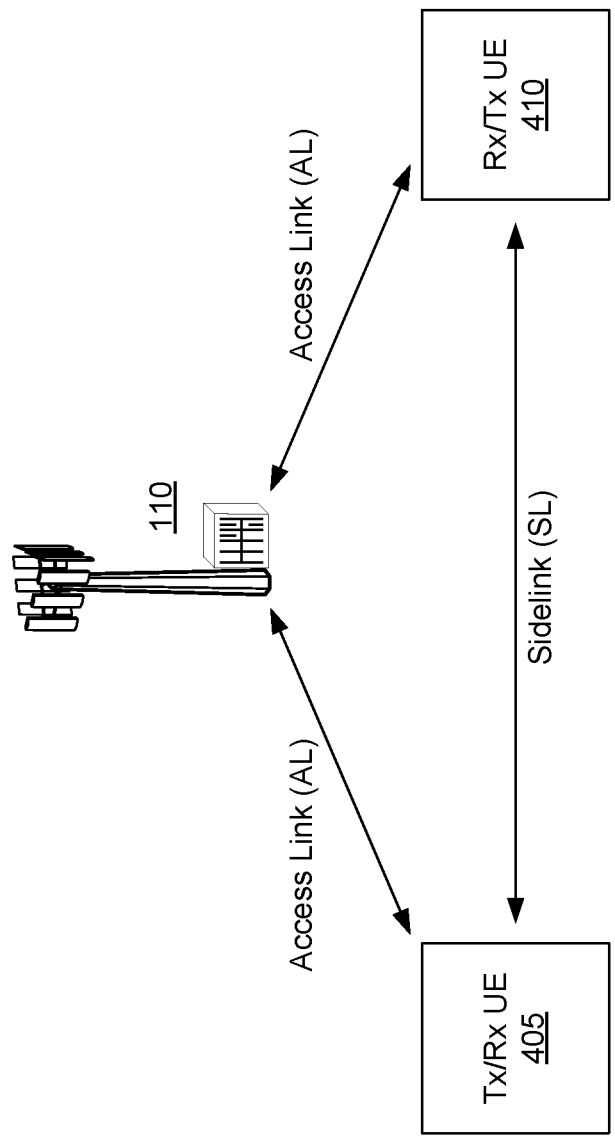
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

A UE may use sidelink communications to communicate with other UEs without the intervention of a centralized scheduling entity. This may be useful in certain types of deployments, such as vehicle-to-anything (V2X) deployments. UEs in a V2X deployment may communicate with each other regarding various actions, scenarios, and/or the like. In many cases, different communications may be associated with different desired ranges, different priority levels, different delay budgets, and/or the like. For example, a signal indicating that a vehicle associated with a UE is to take evasive action may be associated with a high priority level and/or a low delay budget.

One mechanism to ensure that traffic requirements are satisfied is a reservation system. For example, a UE may identify a resource for a future transmission. If the UE does not reserve the resource, then another UE may use the resource for a transmission, thereby causing a collision with the UE's future transmission if the future transmission uses the resource. By reserving the resource, the UE may secure the resource for the future transmission without interference with other UEs. For example, a UE may avoid use of resource reservations based at least in part on a control exclusion (CE) zone. When the UE is within a CE zone of a UE that has reserved a resource, the UE may respect the reservation. Thus, the CE zone may be used to control resource crowding and congestion.

An early reservation is a reservation that is transmitted without being attached to a data transmission. Early reservations involve some overhead. For example, if a UE is configured to always reserve a resource for a transmission on an earliest opportunity, this introduces a fixed overhead per packet, and introduces additional delay. The additional delay may lead to a smaller number of transmissions and retransmissions that are achieved with a packet delay budget, and may negatively affect reliability. On the other hand, when no early reservation is used, two UEs that contemporaneously reserve a resource may not be aware of each other's reservations of the resource, which may cause collision on the reserved resource.

Some techniques and apparatuses described herein provide a probability-based approach for resource reservation, such as in a sidelink communication system (e.g., an NR V2X system and/or the like). For example, a UE may determine whether sufficient resources are available to transmit a communication in a current slot. Based at least in part on sufficient resources being available, the UE may, based at least in part on a probability-based determination, transmit the communication in the current slot, reserve a future resource for the transmission, or delay transmission or reservation until a next slot. When sufficient resources are not available to transmit the communication, but sufficient resources are available to transmit the early reservation, the UE may, based at least in part on a probability-based determination, reserve a future resource for the transmission or delay transmission or early reservation until the next slot. The probability-based determination may be based at least in part on a wait time associated with the communication, a priority level associated with the communication, a remaining packet delay budget of the communication, and/or the like. In this way, the UE may reduce congestion associated with reserving resources. Furthermore, the UE may reduce collisions due to two or more UEs concurrently reserving the same resource (since some proportion of UEs will immediately transmit or wait until a next slot to transmit due to the probability-based determination). Still further, the UE may improve reliability, particularly in non-heavily-loaded systems, by reducing collisions and congestion.

Figure 5:
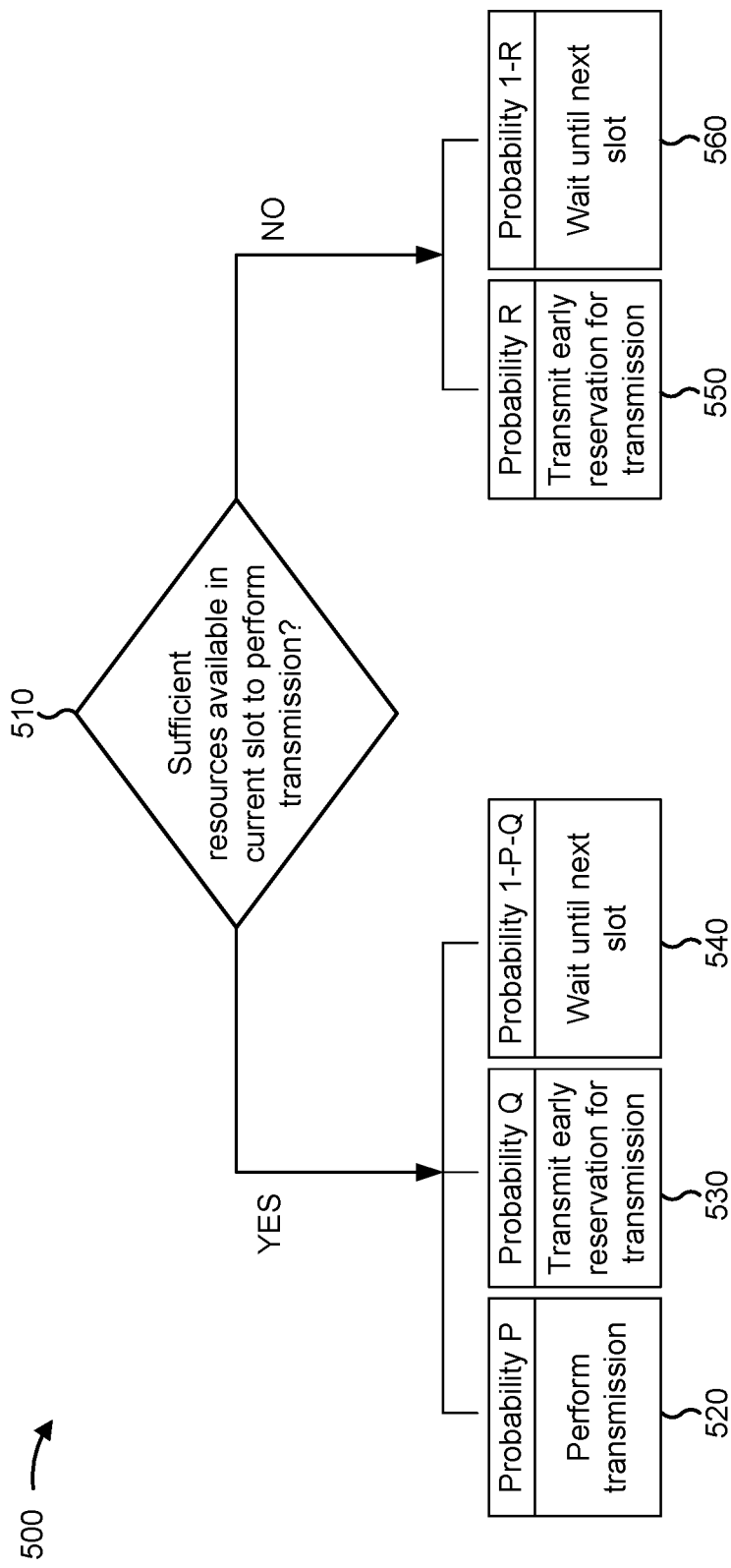
FIG. 5 is a diagram illustrating an example of a probability-based early reservation technique, in accordance with various aspects of the present disclosure.

FIG. 5 is a diagram illustrating an example 500 of a probability-based early reservation technique, in accordance with various aspects of the present disclosure. The operations described in connection with FIG. 5 may be performed by a UE (e.g., UE 120 and/or the like), such as a UE in a sidelink deployment (e.g., an NR V2X deployment and/or the like).

As shown in FIG. 5, and by block 510, the UE may determine whether sufficient resources are available, in a current slot, to perform a transmission. For example, the transmission may include a data transmission (e.g., a physical sidelink shared channel (PSSCH) and/or the like) or a control transmission (e.g., a physical sidelink control channel (PSCCH), a reservation, a CE zone value, and/or the like). In some aspects, a data transmission may carry or be associated with a reservation for one or more retransmissions (e.g., one or more retransmissions of the data transmission). While example 500 is described with reference to a slot, it is to be understood that the operations described herein can be applied for any unit of time, such as a transmission time interval (TTI), a mini-slot, a sub-slot, a group of symbols, a group of slots or mini-slots or sub-slots, and/or the like).

When the UE determines that sufficient resources are available in the current slot to perform the transmission (block 510—YES), then the UE may perform one of the actions indicated by reference numbers 520, 530, and 540 based at least in part on a probability-based determination. Each is described in turn below.

As shown by reference number 520, in a first case, the UE may perform the transmission. For example, the UE may perform the transmission in the current slot using at least part of the sufficient resources that were identified to perform the transmission. As shown, the UE may perform the transmission based at least in part on a first probability (P).

As shown by reference number 530, in a second case, the UE may transmit a reservation signal for one or more resources to be used for the transmission. For example, the reservation signal may be for a resource in a future slot. In some aspects, the reservation signal may be for an early reservation, such as a reservation that is transmitted independently of data (e.g., without being attached to a data transmission). As further shown, the UE may transmit the reservation signal based at least in part on a second probability (Q), which may be different from P or may be equal to P.

As shown by reference number 540, in a third case, the UE may wait until a next slot. In some aspects, the UE may wait until a next TTI, a next mini-slot, a next sub-slot, or a next group of slots (e.g., group of mini-slots, group of sub-slots). In the third case, the UE may return to block 510 in the next slot. As further shown, the UE may wait until the next slot based at least in part on a third probability 1-P-Q.

It can be seen that the probabilities P, Q, and 1-P-Q form a sample space in example 500, since the sum of the probabilities of the events shown by reference numbers 520, 530, and 540 equals one. In some aspects, the respective probabilities may be based at least in part on (e.g., a function of) a wait time (e.g., a permissible wait time before the transmission is transmitted), a priority level of the transmission (e.g., whether the transmission is an ultra-reliable low latency communication (URLLC) or a best-effort communication, whether the transmission is associated with a threshold probability level, and/or the like), a remaining packet delay budget (PDB) (e.g., when the remaining PDB is shorter than a threshold, the probability of transmitting in the current slot may be higher than when the PDB is not shorter than the threshold using the techniques described herein), and/or the like.

When the UE determines that sufficient resources are not available in the current slot to perform the transmission (block 510—NO), then the UE may perform one of the actions indicated by reference numbers 550 and 560 based at least in part on a probability-based determination. In some aspects, the UE may perform one of the actions indicated by reference numbers 550 and 560 when the UE determines that insufficient resources are available for the transmission and sufficient resources are available to transmit an early reservation signal for a future resource on which to transmit the transmission. The actions indicated by reference numbers 550 and 560 are described in turn below.

As shown by reference number 550, in a first case, the UE may transmit a reservation signal for one or more resources to be used for the transmission. For example, the reservation signal may be for a resource in a future slot (e.g., since sufficient resources for the transmission are not available in the current slot). As further shown, the UE may transmit the reservation signal based at least in part on a fourth probability level (R).

As shown by reference number 560, in a second case, the UE may wait until a next slot. In some aspects, the UE may wait until a next TTI, a next mini-slot, a next sub-slot, or a next group of slots (e.g., group of mini-slots, group of sub-slots). In the second case, the UE may return to block 510 in the next slot. As further shown, the UE may wait until the next slot based at least in part on a fifth probability level 1-R.

It can be seen that the probabilities R and 1-R form a sample space in example 500, since the sum of the probabilities of the events shown by reference numbers 550 and 560 equals one. In some aspects, the respective probabilities may be based at least in part on (e.g., a function of) a wait time (e.g., a permissible wait time before the transmission is transmitted), a priority level of the transmission (e.g., whether the transmission is an ultra-reliable low latency communication (URLLC) or a best-effort communication, whether the transmission is associated with a threshold probability level, and/or the like), a remaining PDB (e.g., when the PDB is shorter than a threshold, the probability of transmitting in the current slot may be higher than when the PDB is not shorter than the threshold), and/or the like. In some aspects, P, Q, and R may all have different values. In some aspects, two or more of P, Q, and R may have the same value.

Since the determinations are based at least in part on relative probability values, any suitable probabilistic or pseudo-probabilistic approach, such as a random number-based approach, a pseudo-random approach, a sequence-based approach, and/or the like, may be used.

As indicated above, FIG. 5 is provided as an example. Other examples may differ from what is described with respect to FIG. 5.

Figure 6:
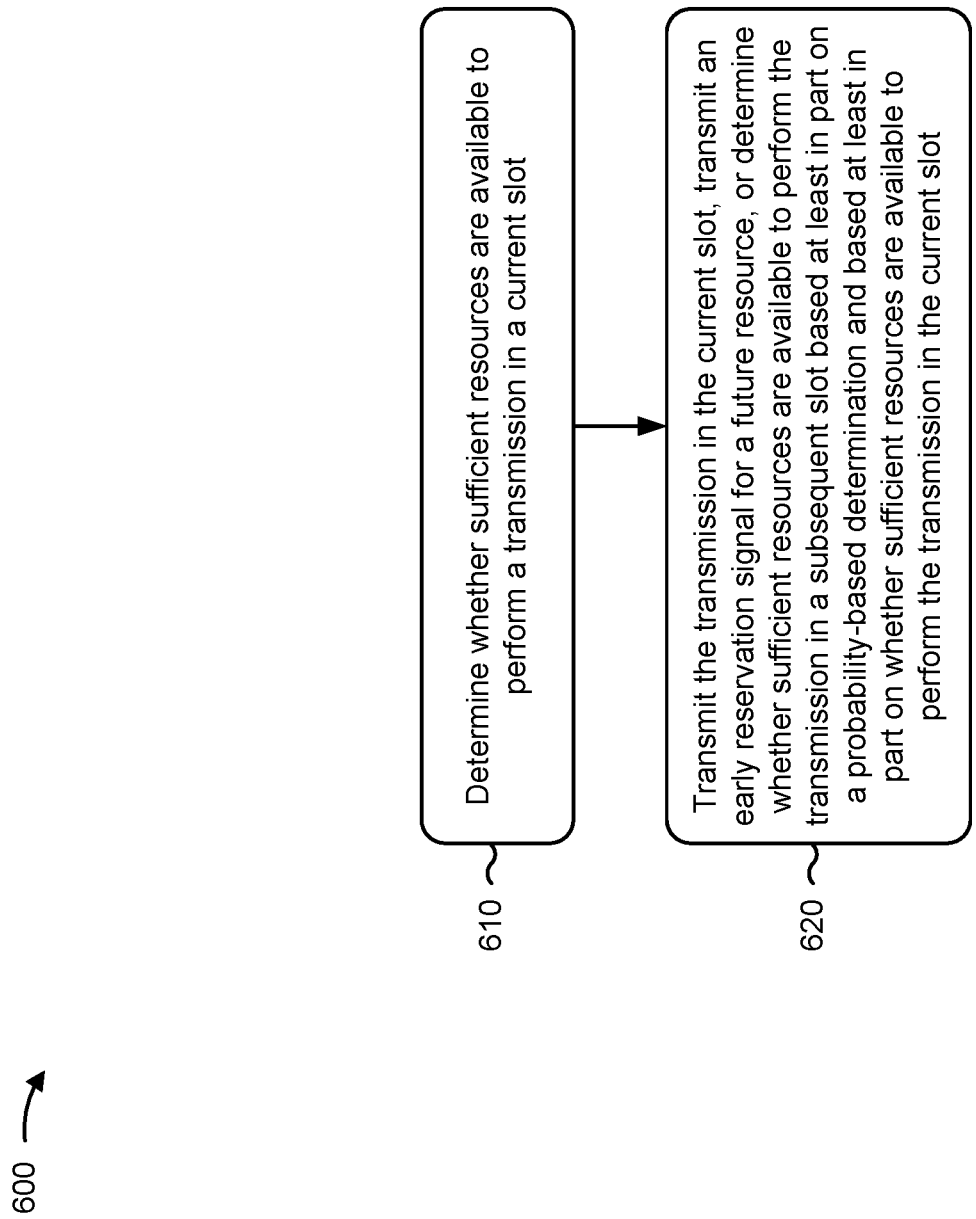
FIG. 6 is a diagram illustrating an example process performed, for example, by a user equipment, in accordance with various aspects of the present disclosure.

FIG. 6 is a diagram illustrating an example process 600 performed, for example, by a user equipment, in accordance with various aspects of the present disclosure. Example process 600 is an example where a UE (e.g., user equipment 120 and/or the like) performs operations associated with early resource reservation for new radio.

As shown in FIG. 6, in some aspects, process 600 may include determining whether sufficient resources are available to perform a transmission in a current slot (block 610). For example, the user equipment (e.g., using receive processor 258, transmit processor 264, controller/processor 280, memory 282, and/or the like) may determine whether sufficient resources are available to perform a transmission in a current slot, as described above.

As further shown in FIG. 6, in some aspects, process 600 may include transmitting the transmission in the current slot, transmitting an early reservation signal for a future resource, or determining whether sufficient resources are available to perform the transmission in a subsequent slot based at least in part on a probability-based determination and based at least in part on whether sufficient resources are available to perform the transmission in the current slot (block 620). For example, the user equipment (e.g., using controller/processor 280, transmit processor 264, TX MIMO processor 266, MOD 254, antenna 252, and/or the like) may transmit the transmission in the current slot, transmit an early reservation signal for a future resource, or determine whether sufficient resources are available to perform the transmission in a subsequent slot based at least in part on a probability-based determination and based at least in part on whether sufficient resources are available to perform the transmission in the current slot, as described above.

Process 600 may include additional aspects, such as any single aspect or any combination of aspects described below and/or in connection with one or more other processes described elsewhere herein.

In a first aspect, the transmission comprises a data transmission.

In a second aspect, alone or in combination with the first aspect, based at least in part on sufficient resources being available to perform the transmission in the current slot, transmitting the transmission in the current slot, transmitting the early reservation signal for a future resource, or determining whether sufficient resources are available to perform the transmission further comprises: transmitting the transmission in the current slot with a first probability, transmitting the early reservation signal for the future resource with a second probability, or waiting until the subsequent slot, and determining whether sufficient resources are available to perform the transmission in the subsequent slot with a third probability.

In a third aspect, alone or in combination with one or more of the first through second aspects, a sum of the first probability, the second probability, and the third probability equals one.

In a fourth aspect, alone or in combination with one or more of the first through third aspects, at least one of the first probability, the second probability, or the third probability is based at least in part on at least one of: a wait time from a packet arrival to the current slot, a priority level of the transmission, or a remaining delay budget associated with the transmission.

In a fifth aspect, alone or in combination with one or more of the first through fourth aspects, when sufficient resources are not available to perform the transmission in the current slot, transmitting the transmission in the current slot, transmitting the early reservation signal for the future resource, or determining whether sufficient resources are available to perform the transmission further comprises: transmitting the early reservation signal for the future resource with a first probability (referred to elsewhere herein as a fourth probability), or waiting until the subsequent slot, and determining whether sufficient resources are available to perform the transmission in the subsequent slot with a second probability (referred to elsewhere herein as a fifth probability).

In a sixth aspect, alone or in combination with one or more of the first through fifth aspects, a sum of the first probability and the second probability equals one.

In an seventh aspect, alone or in combination with one or more of the first through sixth aspects, at least one of the first probability or the second probability is based at least in part on at least one of: a wait time from a packet arrival to the current slot, a priority level of the transmission, or a remaining delay budget associated with the transmission.

In an eighth aspect, alone or in combination with one or more of the first through seventh aspects, determining whether sufficient resources are available to perform the transmission in the current slot further comprises: determining whether sufficient resources are available to perform the transmission in the current slot and whether sufficient resources are available to transmit the early reservation signal for the future resource in the current slot.

In a ninth aspect, alone or in combination with one or more of the first through eighth aspects, the transmission is associated with a vehicle-to-anything (V2X) communication.

In a tenth aspect, alone or in combination with one or more of the first through ninth aspects, determining whether sufficient resources are available to perform the transmission in the subsequent slot further comprises deferring the transmission to the subsequent slot.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
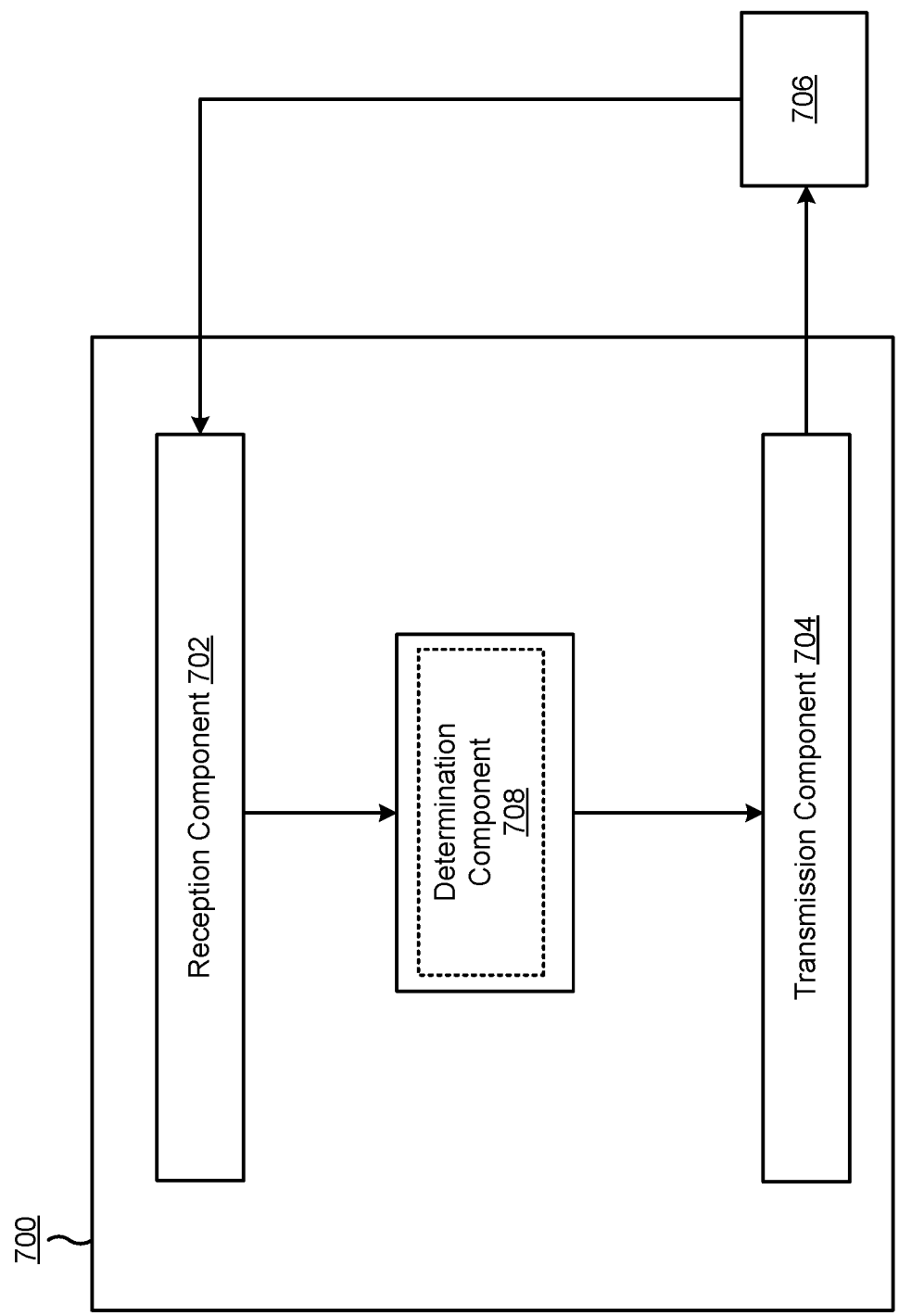
FIG. 7 is a block diagram of an example apparatus for wireless communication.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 706 may include a determination component 708.

In some aspects, the apparatus 700 may be configured to perform one or more operations described herein in connection with FIGS. 3-6. Additionally or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The determination component 708 may determine whether sufficient resources are available to perform a transmission in a current slot. For example, the determination component 708 may perform this determination based at least in part on information received or measurements performed by the reception component 702. In some aspects, the determination component 708 may determine whether sufficient resources are available to perform the transmission in a subsequent slot based at least in part on a probability-based determination and based at least in part on whether sufficient resources are available to perform the transmission in the current slot. The transmission component 704 may transmit the transmission in the current slot or transmit an early reservation signal for a future resource in a subsequent slot based at least in part on a probability-based determination and based at least in part on whether sufficient resources are available to perform the transmission in the current slot.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining whether sufficient resources are available to perform a transmission in a current slot; and
    transmitting the transmission in the current slot based at least in part on a first probability, transmitting an early reservation signal for a future resource based at least in part on a second probability, or determining whether sufficient resources are available to perform the transmission in a subsequent slot based at least in part on a third probability, based at least in part on whether sufficient resources are available to perform the transmission in the current slot,
        wherein at least one of the first probability, the second probability, or the third probability is based at least in part on:

a priority level of the transmission, and
a remaining packet delay budget (PDB) associated with the transmission.

2. The method of claim 1, wherein the transmission comprises a data transmission.

3. The method of claim 1, wherein determining whether sufficient resources are available to perform the transmission in the current slot comprises:
determining that there are sufficient resources available to perform the transmission in the current slot, and
wherein transmitting the transmission in the current slot based at least in part on the first probability, transmitting the early reservation signal for the future resource based at least in part on the second probability, or determining whether sufficient resources are available to perform the transmission in the subsequent slot based at least in part on the third probability comprises:
transmitting the transmission in the current slot based at least in part on the first probability,
transmitting the early reservation signal for the future resource based at least in part on the second probability, or
waiting until the subsequent slot to determine whether sufficient resources are available to perform the transmission in the subsequent slot based at least in part on the third probability.

4. The method of claim 1, wherein a sum of the first probability, the second probability, and the third probability equals one.

5. The method of claim 1, wherein determining whether sufficient resources are available to perform the transmission in the current slot comprises:
determining that sufficient resources are not available to perform the transmission in the current slot, and
wherein transmitting the transmission in the current slot based at least in part on the first probability, transmitting the early reservation signal for the future resource based at least in part on the second probability, or determining whether sufficient resources are available to perform the transmission in the subsequent slot based at least in part on the third probability, comprises:
transmitting the early reservation signal for the future resource based at least in part on the first probability, or
waiting until the subsequent slot to determine whether sufficient resources are available to perform the transmission in the subsequent slot based at least in part on the second probability.

6. The method of claim 1, wherein a sum of the first probability and the second probability equals one.

7. The method of claim 1, wherein determining whether sufficient resources are available to perform the transmission in the current slot further comprises:
determining whether sufficient resources are available to perform the transmission in the current slot and whether sufficient resources are available to transmit the early reservation signal for the future resource in the current slot.

8. The method of claim 1, wherein the transmission is associated with a vehicle-to-anything (V2X) communication.

9. The method of claim 1, wherein transmitting the transmission in the current slot based at least in part on the first probability, transmitting the early reservation signal for the future resource based at least in part on the second probability, or determining whether sufficient resources are available to perform the transmission in the subsequent slot based at least in part on the third probability comprises:
determining whether sufficient resources are available to perform the transmission in the subsequent slot based at least in part on the third probability; and
deferring the transmission to the subsequent slot.

10. A user equipment (UE) for wireless communication, comprising:
a memory; and
one or more processors coupled to the memory, the one or more processors configured to cause the UE to:
determine whether sufficient resources are available to perform a transmission in a current slot; and
transmit the transmission in the current slot based at least in part on a first probability, transmit an early reservation signal for a future resource based at least in part on a second probability, or determine whether sufficient resources are available to perform the transmission in a subsequent slot based at least in part on a third probability, based at least in part on whether sufficient resources are available to perform the transmission in the current slot,
wherein at least one of the first probability, the second probability, or the third probability is based at least in part on:
a priority level of the transmission, and
a remaining delay budget associated with the transmission.

11. The UE of claim 10, wherein the transmission comprises a data transmission.

12. The UE of claim 10, wherein, to determine whether sufficient resources are available to perform the transmission in the current slot, the one or more processors are configured to cause the UE to:
determine that there are sufficient resources available to perform the transmission in the current slot, and
wherein, to transmit the transmission in the current slot based at least in part on the first probability, transmit the early reservation signal for the future resource based at least in part on the second probability, or determining whether sufficient resources are available to perform the transmission based at least in part on the third probability, the one or more processors are configured to cause the UE to:
transmit the transmission in the current slot based at least in part on the first probability,
transmit the early reservation signal for the future resource based at least in part on the second probability, or
wait until the subsequent slot to determine whether sufficient resources are available to perform the transmission in the subsequent slot based at least in part on the third probability.

13. The UE of claim 10, wherein a sum of the first probability, the second probability, and the third probability equals one.

14. The UE of claim 10, wherein, to determine whether sufficient resources are available to perform the transmission in the current slot, the one or more processors are configured to cause the UE to:
determine that sufficient resources are not available to perform the transmission in the current slot, and
wherein, to transmit the transmission in the current slot based at least in part on the first probability, transmit the early reservation signal for the future resource based at least in part on the second probability, or determine whether sufficient resources are available to perform the transmission in the subsequent slot based at least in part on the third probability, the one or more processors are configured to cause the UE to:
  transmit the early reservation signal for the future resource with the first probability, or
  wait until the subsequent slot to determine whether sufficient resources are available to perform the transmission in the subsequent slot based at least in part on the second probability.

15. The UE of claim 10, wherein a sum of the first probability and the second probability equals one.

16. The UE of claim 10, wherein, to determine whether sufficient resources are available to perform the transmission in the current slot, the one or more processors are configured to cause the UE to:
  determine whether sufficient resources are available to perform the transmission in the current slot and whether sufficient resources are available to transmit the early reservation signal for the future resource in the current slot.

17. The UE of claim 10, wherein the transmission is associated with a vehicle-to-anything (V2X) communication.

18. The UE of claim 10, wherein determining whether sufficient resources are available to perform the transmission in the subsequent slot wherein the one or more processors are further configured to:
  defer the transmission to the subsequent slot.

19. A non-transitory computer-readable medium storing one or more instructions for wireless communication, the one or more instructions comprising:
  one or more instructions that, when executed by one or more processors of a user equipment (UE), cause the UE to:
    determine whether sufficient resources are available to perform a transmission in a current slot; and
    transmit the transmission in the current slot based at least in part on a first probability, transmit an early reservation signal for a future resource based at least in part on a second probability, or determine whether sufficient resources are available to perform the transmission in a subsequent slot based at least in part on a third probability, based at least in part on whether sufficient resources are available to perform the transmission in the current slot,
    wherein at least one of the first probability, the second probability, or the third probability is based at least in part on:
      a priority level of the transmission, and
      a remaining packet delay budget (PDB) associated with the transmission.

20. The non-transitory computer-readable medium of claim 19, wherein the transmission comprises a data transmission.

21. The non-transitory computer-readable medium of claim 19, wherein the one or more instructions, when executed by the one or more processors of the UE to cause the UE to determine whether sufficient resources are available to perform the transmission in the current slot, cause the UE to:
  determine that there are sufficient resources available to perform the transmission in the current slot,
    wherein the one or more instructions, when executed by the one or more processors of the UE to cause the UE to transmit the transmission in the current slot based at least in part on the first probability, transmit the early reservation signal for the future resource based at least in part on the second probability, or determine whether sufficient resources are available to perform the transmission in the subsequent slot based at least in part on the third probability, cause the UE to:
      transmit the transmission in the current slot based at least in part on the first probability,
      transmit the early reservation signal for the future resource based at least in part on the second probability, or
      wait until the subsequent slot to determine whether sufficient resources are available to perform the transmission in the subsequent slot based at least in part on the third probability.

22. The non-transitory computer-readable medium of claim 19, wherein a sum of the first probability, the second probability, and the third probability equals one.

23. The non-transitory computer-readable medium of claim 19, wherein the one or more instructions, when executed by the one or more processors of the UE to cause the UE to determine whether sufficient resources are available to perform the transmission in the current slot, cause the UE to:
  determine that sufficient resources are not available to perform the transmission in the current slot, and
    wherein the one or more instructions, when executed by the one or more processors of the UE to cause the UE to transmit the transmission in the current slot based at least in part on the first probability, transmit the early reservation signal for the future resource based at least in part on the second probability, or determine whether sufficient resources are available to perform the transmission in the subsequent slot based at least in part on the third probability, cause the UE to:
      transmit the early reservation signal for the future resource based at least in part on the first probability, or
      wait until the subsequent slot to determine whether sufficient resources are available to perform the transmission in the subsequent slot based at least in part on the second probability.

24. An apparatus for wireless communication, comprising:
  means for determining whether sufficient resources are available to perform a transmission in a current slot; and
  means for transmitting the transmission in the current slot based at least in part on a first probability, transmitting an early reservation signal for a future resource based at least in part on a second probability, or determining whether sufficient resources are available to perform the transmission in a subsequent slot based at least in part on a third probability based at least in part on whether sufficient resources are available to perform the transmission in the current slot,
    wherein at least one of the first probability, the second probability, or the third probability is based at least in part on:
      a priority level of the transmission, and
      a remaining packet delay budget (PDB) associated with the transmission.

25. The apparatus of claim 24, wherein the means for determining whether sufficient resources are available to perform the transmission in the current slot comprises:

means for determining that there is sufficient resources being available to perform the transmission in the current slot, and wherein the means for transmitting the transmission in the current slot based at least in part on the first probability, transmitting an early reservation signal for a future resource based at least in part on the second probability, or determining whether sufficient resources are available to perform the transmission based at least in part on the third probability comprises:

means for transmitting the transmission in the current slot based at least in part on the first probability, means for transmitting the early reservation signal for the future resource based at least in part on the second probability, or means for waiting until the subsequent slot to determine whether sufficient resources are available to perform the transmission in the subsequent slot based at least in part on the third probability.

26. The method of claim 1, wherein at least one of:
the priority level of the transmission comprises at least one of:
  the transmission being an ultra-reliable low latency communication (URLLC),
  the transmission being a best-effort communication, or
  the transmission being associated with a threshold probability level, or
the remaining delay budget associated with the transmission comprises at least one of:
  the remaining PDB being less than a threshold, or
  the first probability associated with transmitting in the current slot being higher than when the remaining PDB is not less than the threshold.

27. The UE of claim 10, wherein at least one of:
the priority level of the transmission comprises at least one of:
  the transmission being an ultra-reliable low latency communication (URLLC),
  the transmission being a best-effort communication, or
  the transmission being associated with a threshold probability level, or
the remaining delay budget associated with the transmission comprises at least one of:
  the remaining PDB being less than a threshold, or
  the first probability associated with transmitting in the current slot being higher than when the remaining PDB is not less than the threshold.

28. The UE of claim 10, wherein at least one of the first probability, the second probability, or the third probability is further based at least in part on at least in part on a wait time from a packet arrival to the current slot.

29. The UE of claim 10, wherein at least two of the first probability, the second probability, or the third probability are different.

30. The UE of claim 10, wherein at least two of the first probability, the second probability, or the third probability are equal.

* * * * *